United States Patent [19]
Magalotti et al.

[11] 3,784,341
[45] Jan. 8, 1974

[54] HAND TOOL FOR DISPENSING FROZEN FOOD ITEMS

[76] Inventors: Thomas D. Magalotti, 4371 Ammon Rd., Lyndhurst, Ohio 44121; Ernest August, deceased, late of South Euclid, Ohio 44121 by Eleanor J. August, executrix

[22] Filed: Apr. 6, 1972

[21] Appl. No.: 241,748

Related U.S. Application Data

[63] Continuation-in-part of Ser. No. 883,784, Jan. 28, 1970, abandoned.

[52] U.S. Cl. ............................................... 425/280
[51] Int. Cl. ................................................ A23g 5/02
[58] Field of Search ................... 425/280, 285, 278, 425/276; 310/50; 15/167 R

[56] References Cited
UNITED STATES PATENTS

| | | | |
|---|---|---|---|
| 1,862,527 | 6/1932 | Cox | 425/285 X |
| 1,847,328 | 3/1932 | Berzon | 425/285 |
| 2,412,050 | 12/1946 | Lawrence et al. | 425/280 |
| 3,196,298 | 7/1965 | Kent | 310/50 |
| 3,379,906 | 4/1968 | Spohr | 310/50 |
| 2,239,046 | 4/1941 | Lloyd | 425/281 |
| 2,210,623 | 8/1940 | Kelly | 425/281 X |
| 1,763,389 | 6/1930 | Chapman | 425/280 |
| 2,638,065 | 5/1953 | Tarr | 425/280 X |

*Primary Examiner*—J. Spencer Overholser
*Assistant Examiner*—David S. Safran
*Attorney*—Albert R. Teare et al.

[57] ABSTRACT

A food dispensing tool including an elongated body having a hollow semi-spherical scoop member adjacent one end and a handle portion adjacent the opposite end. The scoop member includes a circular endless peripheral edge defining an opening therefor. A semi-circular blade is mounted for oscillatory movement within the scoop member being defined by opposed, laterally extending cutting edges positionable adjacent opposed portions of the peripheral edge of the scoop member. A power means including a rotatable shaft is operably connected to the cutter blade. Rotation limiting means is connected between the cutter blade and shaft for converting rotary movement of the shaft to oscillatory movement of the cutting blade for alternately positioning the cutting edges in cutting relation adjacent the opposed portions of the peripheral edge of the scoop member.

8 Claims, 14 Drawing Figures

PATENTED JAN 8 1974
3,784,341
SHEET 1 OF 2
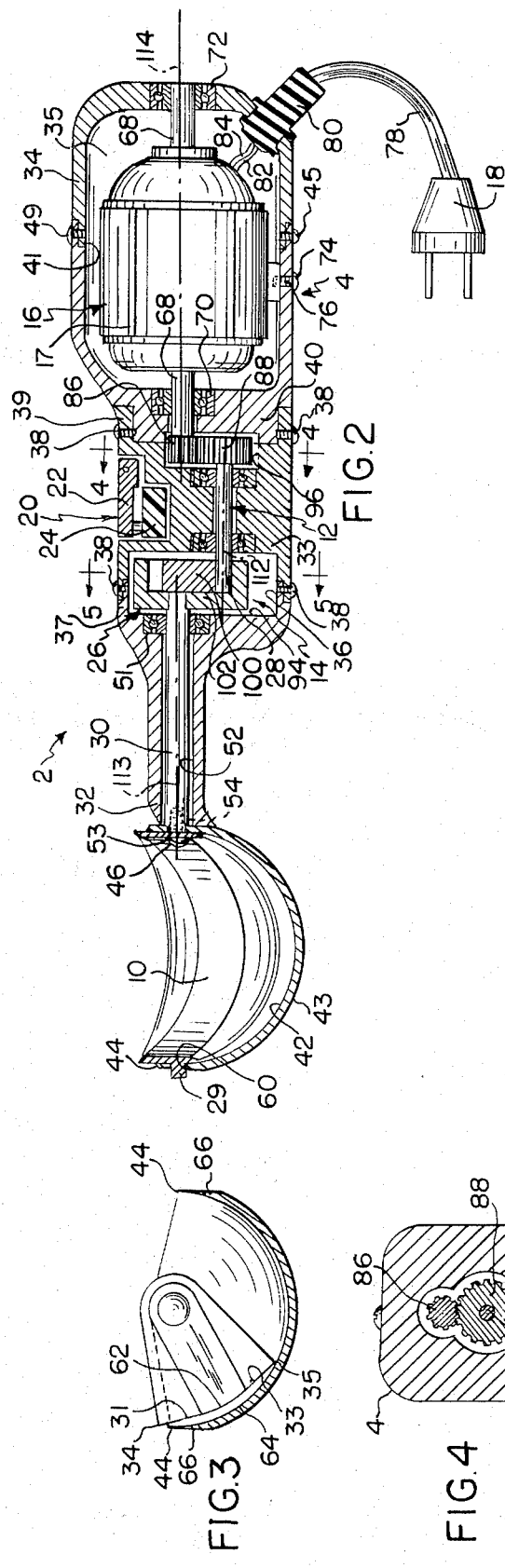
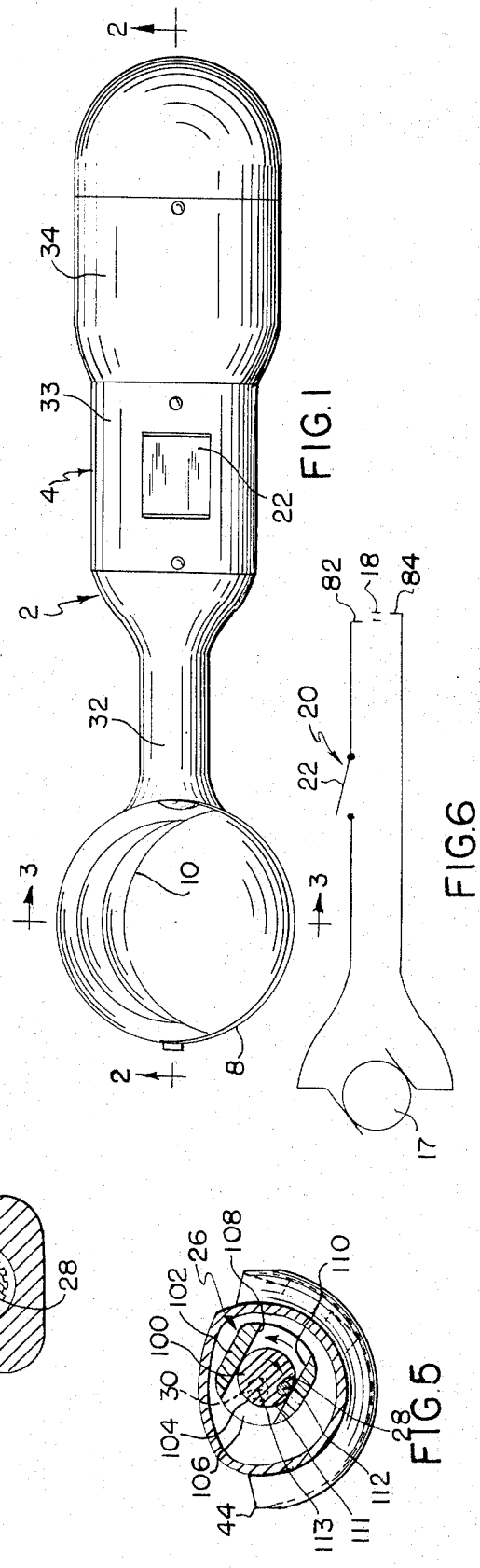

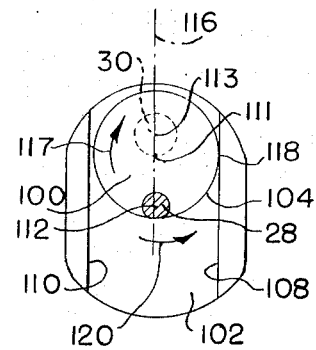
FIG.7
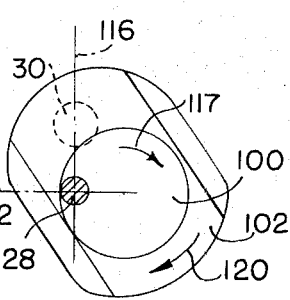
FIG.8
FIG.9
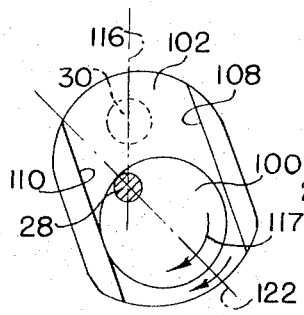
FIG.10
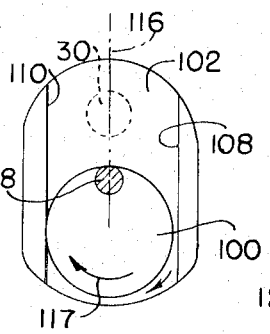
FIG.11
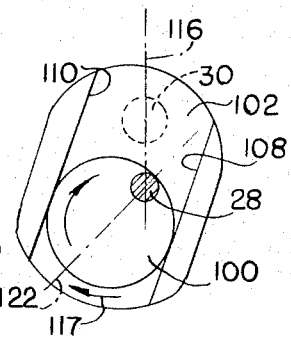
FIG.12
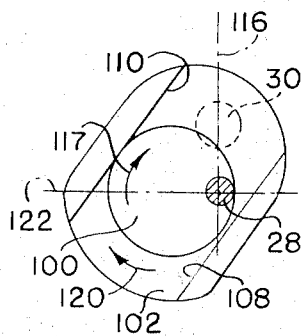
FIG.13
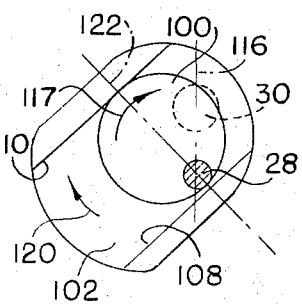
FIG.14

3,784,341

HAND TOOL FOR DISPENSING FROZEN FOOD ITEMS

CROSS REFERENCE TO RELATED APPLICATION

The present application is a continuation-in-part of U.S. patent application, Ser. No. 883,784 of Ernest August et al which was filed on Jan. 28, 1970 now abandoned.

BACKGROUND OF THE INVENTION

The present invention is related to hand tools and more particularly, to hand tools for dispensing food items, such as ice cream, sherbet or the like. Ice cream, sherbet and similar food items are packaged in large bulk containers by the manufacturers for shipment to retailers who remove the ice cream from the containers in the form of individual charges or dips for making ice cream cones.

Heretofore, the ice cream has been removed from such containers by a hand tool which includes a cup-shaped scoop member. These containers are stored in freezers to keep the ice cream in a frozen condition until dispensed. Often the frozen ice cream is extremely hard making it very difficult to penetrate the ice cream with the scoop member. This results in considerable loss of time in forming a particular charge or dip, as well as the formation of undesirably shaped charges or dips.

Recently, a large number of retail outlets have been established which dispense exclusively ice cream in the form of cones or "hand-packed" cartons. In such establishments, when the ice cream is provided in an extremely hard state, as aforementioned, is it extremely difficult and tiring to an operator to remove the ice cream from the bulk containers in the form of dips often causing delays which are annoying to the waiting customers, therefore, it has become necessary to provide an easier and more efficient means for forming dips of ice cream in order to provide speedier service to these waiting customers.

SUMMARY OF THE INVENTION

The present invention contemplates providing an improved hand tool for dispensing food items, such as ice cream, sherbet or the like, and comprises an elongated body including a handle portion disposed at one end and a hollow, open-top scoop member adjacent the opposite end. A cutter blade is mounted for oscillatory movement within the scoop member for cutting engagement with the ice cream. The scoop member is of a generally semi-spherical configuration being defined adjacent its open top by an endless peripheral edge. The cutter blade is generally semi-circular in configuration being defined by opposed, generally laterally extending cutting edges. One of the cutting edges is positionable in cutting relation adjacent one portion of the peripheral edge of the scoop member and the other of the cutting edges is positionable in cutting relation adjacent another portion of the peripheral edge of the scoop member. A power means including a drive assembly is supported by the body including one shaft member arranged for rotation in one direction. Another shaft member is operably connected to the cutter blade for imparting movement thereto. A rotation limiting means is connected between the one shaft member and the other shaft member for conferting the rotary movement of the one shaft member to oscillatory movement of the other shaft member for alternately positioning the respective ones of the cutting edges in cutting relation adjacent the respective opposed portions of the peripheral edge of the scoop member.

BRIEF DESCRIPTION OF THE DRAWINGS

FIG. 1 is a top plan view of the cutter scoop of the present invention;

FIG. 2 is a side elevation, cross-sectional view taken along line 2—2 of FIG. 1;

FIG. 3 is a sectional view taken along line 3—3 of FIG. 1;

FIG. 4 is a sectional view taken along line 4—4 of FIG. 2;

FIG. 5 is a sectional view taken along line 5—5 of FIG. 2;

FIG. 6 is a typical schematic diagram of the electrical circuit of the cutter scoop of the present invention; and FIGS. 7–14 are diagramatic illustrations showing various stages of movement of the rotation limiting means of the present invention.

DESCRIPTION OF THE PREFERRED EMBODIMENTS

Referring again to FIG. 1, the tool of the present invention is shown, generally at 2, as including a body or casing 4 having a scoop member 8, such as a cup or the like, adjacent the one end, such as the front end. A cutter blade 10 is mounted interiorly the scoop member 8 being arranged for oscillating or swinging movement within the scoop member 8 for cutting engagement with the food item, such as an ice cream and for separating the ice cream from the scoop member in a manner to be described more fully hereinafter, A drive mechanism 12 is shown as being enclosed within the body 4 and includes rotation limiting means 14 for imparting oscillating movement to the cutter blade 10. A power unit 16, such as an electric motor or the like, is shown mounted within the body 4 being arranged for connection to a suitable source of electrical energy, such as by a plug 18, for operating the tool 2. Referring now also to FIG. 6, a switch assembly 20 is mounted on the body 4 and includes a push button 22 disposed on the exterior on the body 4 selectively actuating a suitable switch device 24, such as a micro-switch or the like, to apply power from the electrical energy source to the electric motor 16. The rotation limiting means 14 is shown as including a cam assembly 26 (FIG. 5) which is operably connected to the motor 16 by a shaft 28 and to the cutter blade 10 by a shaft 30. The cam assembly 26 is arranged such that continuous rotational movement of the shaft 28 in one direction will cause oscillating movement in the shaft 30 for swinging or oscillating the cutter blade 10 back and forth within the scoop member 8.

Referring now again to FIG. 2, the body 4 may be made of any suitable material such as plastic, metal or the like and is of an elongated construction and includes a forwardly extending stem portion 32 adjacent the front end, an intermediate portion 33 and a handle portion 34 which includes a hollow cavity 35 adjacent the rear end. The stem portion 32 includes a rearwardly extending annular lip 36 and the intermediate portion 33 includes at its front end a correspondingly configured extending lip 37 adapted for slide-fitted interengagement within the lip 36 for connecting the stem portion 32 to the intermediate portion 33, such as by fasteneres 38. Likewise, the intermediate portion 33 includes at its rear end another annular lip 39 and the handle portion 34 includes a correspondingly configured lip 40 adapted for slide-fitted interengagement with the lip 39 for connecting the handle portion 34 to the intermediate portion 33. Similarly, the handle portion may be split to enable acess to the cavity 35, and as shown may include correspondingly configured lips 41 and 45 adapted for slide-fitted interengagement with one another. The screws, as at 49, may be provided for threadably connecting the handle portion 37 together.

As shown in FIG. 2, the scoop member or bowl 8 is rigidly connected in any suitable manner such as welding or the like, to one end of the stem portion 32 and is shown as being of a hollow, open-topped construction, including a smooth, generally uniformly curving interior surface 42 and a correspondingly curving outer surface 43. The surfaces 42 and 43 are shown as being generally semi-spherical in configuration and merge adjacent the open top of the scoop member 8 to define an endless, generally circular upper marginal edge 44 (FIGS. 1 and 3).

The cutter blade 10 is of a generally semi-circular configuration, when viewed in side elevation (FIG. 1), being curved so as to conform to the interior surface 42 of the scoop member 18. As shown in FIG. 2, the cutter blade 10 is attached at one end, such as by a screw 46, to the shaft 30 on one side of the bowl 8 adjacent the marginal edge 44. The other end of the cutter blade 10 is pivotally connected to the scoop member 8 adjacent a diametrically opposed side of the marginal edge 44 by a cylindrical pin 29 which is axially aligned with the shaft 30 and extends through an opening 60 in the scoop member 8. Referring now to FIG. 3, the cutter blade 10 is shown as being generally arcuate in transverse cross-section including an inner surface 62 and an outer surface 64. The outer surface 64 is shown as having substantially the same radius of curvature as the interior surface 26 of the scoop member 8 such that the cutter blade will slide in flush relation therealong. The inner surface 62 of the cutter blade 10 is shown as having the same radius of curvature as the outer surface 64 and the blade is machined or otherwise tapered downwardly and outwardly adjacent its opposed edges, as at 31 and 33, defining spaced, generally laterally extending cutting edges 34 and 35 which extend lengthwise along opposite sides of the cutter blade 10 and thus providing a cutter blade 10 which is wider at its center than at its opposed ends. As shown in FIG. 3, the outer surface 43 of the scoop member 8 is machined or otherwise beveled adjacent the upper marginal edge 44, such as at 66, such that its outer surface 43 merges smoothly with the outer surface 64 of the cutter blade 10 for reasons which will become more apparent hereinafter.

The shaft 30 is shown as being generally cylindrical in cross section (FIG. 5) and extends through and is supported for rotation within a cylindrical bore 52 in the stem portion 32, being journaled for rotation at one end, such as its rearward end in a bearing 51. The shaft 30 includes a stub portion 53 of reduced diameter adjacent its forward end which extends through and is supported for pivotal movement in an opening 54 in one side of the scoop member 8 and projects into the interior thereof being adapted for connection to the cutter blade 10. The stub portion 53 is keyed or otherwise fixedly connected in any suitable manner to the cutter blade 10. For example, the stub portion 53 may be formed so as to have a polygonal cross section, such as square, and may be fitted within a similarly configured opening in the cutter blade, as at 56, to prevent relative movement of the cutter blade 10 with respect to the shaft 30. The shaft 30 is also shown as including an axially extending threaded bore 58 at its front end which is adapted to threadably receive the screw 46 having a head 47 for engaging the cutter blade 10 and securing the cutter blade 10 to the shaft 30.

The motor 17 is shown mounted within the cavity 35 and includes a drive shaft 68 which projects forwardly and rearwardly of the motor frame being journaled for rotation in bearings 70 and 72 supported by the body 4. The motor 17 is restricted against rotation by a set screw 74 which is threaded through the body 4 and into the motor frame, as at 76. The plug 18 includes a cord 78 which may be attached to the body 4, such as by a grommet 80, having leads 82 and 84 which extend through the grommet 80 into the cavity 35 for attachment to the motor 17 through the switch assembly 20 (FIG. 6) to enable electrical energy to be selectively applied thereto.

The body 4 may include spaced cavities 94 and 96. A cylindrical bore 93 extends lengthwise between the cavities 94 and 96 being adapted to receive the shaft 28 therethrough. Bearings 90 and 92 are shown mounted at opposite ends of the bore 93, and the shaft 28 is journaled for rotation in the bearings 90 and 92 having one end, such as its rearward end, extending into the cavity 96 for operable connection to the drive shaft 68. The opposite or forward end of the shaft 28 extends into the cavity 94 being adapted for operable connection to the rotation limiting means 14. In the form shown, a gear 86 is attached to or formed on the forward end of the drive shaft 68 in any suitable manner being adapted for driving engagement with another gear 88 mounted adjacent the rearward end of the shaft 30 for rotating the shaft 30 upon actuation of the motor 17.

Referring now to FIG. 5, the rotation limiting means 14 is shown as including an eccentric cam member 100 fixedly connected to the shaft 30 and a cam follower member 102 which is fixedly connected to the shaft 28. The cam member 100 is shown as being circular in configuration, when viewed in end elevation in FIG. 5, having a circular outer peripheral surface 104 adapted for camming coacting engagement with the cam follower member 102. As shown, the cam follower member 102 includes a transversely extending slot 106 which is defined by spaced, generally parallel side walls 108 and 110 between which the cam member 100 is mounted in the installed position thereof (FIG. 2) so that the peripheral surface 104 will cammingly engage the side walls 108 and 110 upon rotation of the shaft 30. The cam member 100 is shown as having a diameter which is slightly less than the transverse width of the slot 106 to enable the cam member 100 to be rotated therein and relative to the cam follower member 102 as will be described more fully hereinafter.

In the form shown in FIG. 5, the shaft member 30 is attached to the cam member 100 adjacent the peripheral surface 104 such that upon rotation of the shaft 30, the geometrical center 111 of the cam member 100 will be rotated about the central axis of the shaft 28. The shaft 30 is attached to the cam follower member 102 such that upon rotation of the cam member 100, the peripheral surface 104 will engage a respective one of the side walls 108 or 110 to cause oscillating rotational movement of the cam follower member 102.

Referring now to FIGS. 7 to 14, the cutter blade 10 is in the centered position with respect to the upper marginal edge 44 of the scoop member 8 when the cam member 100 and cam follower member 102 are in the positions shown in FIG. 7. In such centered position, the axes of rotation 112, 113 and 114 of the shafts 28, 30 and 68, respectively, extend generally parallel to one another and the geometrical center, as at 111, of the cam member 100 and the axes of rotation 112 and 113 of the shafts 28 and 30, respectively, define a plane 116 which is substantially parallel to the side walls 108 and 110. Further, the cam member 100 extends in a direction toward the shaft 28 having its geometrical center 111 located between the axes of rotation 112 and 113 of the shafts 28 and 30, respectively. By this arrangement, rotation of the shaft 30, such as in a clockwise direction as indicated by the arrow 117 in FIG. 7, will cause the peripheral surface 104 of the cam member 100 to cammingly engage, such as at 118, one of the side walls, such as 108, and pivot the cam follower member 102 in a counterclockwise direction, as indicated by the arrow 120 in FIG. 7. The angular rotation of the cam follower member 102 is determined by the diameter of the cam member 100, the width of the slots 106, and the distance between the axes of rotation 112 and 113 of the shafts 28 and 30, respectively.

FIGS. 8 to 14 diagrammatically illustrate the various stages in one complete revolution of the cam member 100 so as to impart oscillating rotational movement to the cutter member 10. The stages in the rotation of the cam member 100 are shown displaced 45° apart in the clockwise direction as measured between an imaginary line which extends through central axis of the shaft 28 and the geometric center of the cam member 100, as at 122, and the plane 116 extending through the axes of rotation 112 and 113. For purposes of simplicity of illustration in FIGS. 8 to 14, the direction of movement of the cam member 100 will also be designated by an arrow 117 and the direction of movement of the cam follower member 102 will also be designated by an arrow 120, regardless of the direction of movement.

In FIG. 8, the cam member 100, and thus the plane 116, is shown displaced through an angle of 45° from its position in FIG. 7 and the cam follower member 112 has reached its maximum angular displacement in one direction, such as in the counterclockwise direction. As shown in FIG. 8, the maximum angular displacement in the counter-clockwise direction occurs when the imaginary line 122 extends generally perpendicularly to the walls 108 and 110. At this time, camming engagement between the cam member 100 and the cam follower member 102 transfers from the wall 110 to the wall 108 adjacent the shaft 28. As shown in FIGS. 9 through 14, the peripheral surface 104 of the cam member 100 continues to slidably and rollably engage the wall 110 so as to force the cam follower member 102 in the clockwise direction until the line 122 is again perpendicular to the walls 108 and 110 (FIG. 14). At this time, camming engagement between the cam member 100 and the cam follower member 102 transfers from the wall 110 back to the wall 108 adjacent the shaft 28, and thus, the cam follower member is forced to move back in the counter-clockwise direction. As can be seen, by this arrangement the continuous rotation of the shaft 28 in one direction is transferred into oscillating rotation in the shaft member 30, and thus, the cutter blade 10 is moved back and forth within the scoop member 8.

Referring now again to FIGS. 3 and 5, the cutter blade 10 is mounted on the shaft 16, such that the cutting edges 34 and 35 project upwardly above the upper marginal edge 44 of the scoop member 8 when the cutter blade 10 is swung in the clockwise and counter-clockwise directions, respectively. As shown, the upper marginal edge 44 may be tapered downwardly and outwardly from the pivotal connections 28 and 29 of the cutter blade 10, such that the distance between the cutting edges 34 and 35 and the corresponding adjacent portions of the upper marginal edge 44 is greater at the center of the cutting blade then at the opposed ends, as shown in FIG. 3. It is to be understood that the degree of taper of the upper marginal edge 44 and the transverse width of the cutter blade 10 between the cutting edges 34 and 35 can be predetermined so as to control the extent of projection of the cutting edges 34 and 35 above the upper marginal edge 44, as desired.

Referring now to FIG. 6, the micro-switch 24 may be of a normally-open type adapted to be closed upon depression of the push-button 22. As shown, closing of the micro-switch 24 will apply power to the motor 17 for operating the tool. Thus, when it is desired to scoop a food item, such as ice cream, from a container, the operator may pick up the tool by the handle portion 34 and depress the push-button 22 to energize the motor 17 and actuate the cutter blade 10. The scoop member 8 is then inserted into the ice cream, such that the cutting edges 34 and 35 engage the ice cream. By the arrangement shown, the cutting action on the ice cream occurs alternately on opposite sides of the scoop member 8 by the cutting edges 34 and 35 to provide a chopping-like action on the ice cream to ease the ice cream into the interior of the scoop member regardless of which side of the scoop member 8 engages the ice cream. That is, continued rotation of the shaft 30 will cause the cutter blade 10 to be continuously moved from one side to the other side of the scoop member 8 causing the cutting edges 34 and 35 to alternately be projected beyond the upper marginal edge 44 into the cutting position. Further, when the scoop member 8 has been completely filled with ice cream, continued oscillation of the cutter member 10 within the scoop member 8 separates the ice cream from engagement with the interior surface of the scoop member 8 so that a well formed charge of ice cream can be easily and readily discharged from the scoop member 8 into a separator container, such as a cone or the like.

What is claimed is:

1. A portable hand tool for dispensing a food item, such as ice cream or the like, comprising
an elongated body,
said body including a handle portion at one end and a hollow, open-topped scoop member adjacent the opposite end,
a cutter means mounted for oscillatory movement within said scoop member,
said scoop member having a generally uniform curving interior surface being defined adjacent its open top by an endless peripheral edge,
said cutter means being curved to conform to the curvature of said interior surface including opposed, laterally extending cutting edges.

motor means mounted in said body and operably connected to said cutter means for imparting movement thereto, rotation limiting means operably connected between said cutter means and said motor means for limiting oscillatory movement of said cutter means in one direction to position one of the cutting edges of said cutter means above one portion of said peripheral edge of said scoop member and limiting movement in the opposite direction to position the opposed cutting edge of said cutter means above an opposed portion of said peripheral edge on the opposite side of said scoop member.

2. A hand tool in accordance with claim 1, wherein said cutter means comprising an elongated cutter blade, said cutter blade being of a generally uniform thickness throughout its length, said cutter blade being pivotally connected adjacent its opposed ends to oppositely disposed sides of said peripheral edge, said cutter blade being wider at its center than at its opposed ends, and the center of said cutter blade is positioned a greater distance above said peripheral edge of said scoop member than are its opposed ends at the completion of movement of said cutter blade adjacent the opposed portions of said peripheral edge on opposite sides of said scoop member.

3. A hand tool in accordance with claim 1, wherein said cutter means comprises an elongated cutter, said cutter blade being pivotally connected adjacent oppositely disposed sides of said peripheral edge, said peripheral edge is tapered downwardly and outwardly from said pivotal connections such that said cutting edges project a greater distance above said peripheral edge between said pivotal connections than adjacent said pivotal connection.

4. A hand tool in accordance with claim 1, wherein said scoop member is of a generally semi-spherical configuration, and said cutter means comprises an elongated cutter blade having a generally semi-circular configuration when viewed in side elevation.

5. A hand tool in accordance with claim 1, wherein said rotation limiting means comprises one shaft member operably connected to said motor means, and another shaft member operably connected to said cutter means, and eccentric cam means operably connected between one shaft member and said other shaft member to convert continuous rotational movement of said one shaft member in one direction to oscillating rotational movement of said other shaft member.

6. A hand tool in accordance with claim 5, wherein said eccentric cam means comprises, an eccentric cam member connected to said one shaft member, and a cam follower member connected to said other shaft member, said cam follower member including a slot therein being defined by spaced, generally parallel side walls, said cam member being mounted on said one shaft member in offset relation from its geometrical center, and said cam member being disposed within said slot and including a peripheral edge for camingly coacting with said sidewalls upon rotation of said one shaft member to alternatively move said cam follower member in one direction during one-half of a full revolution of the said one shaft member and in the opposite direction during remaining one-half revolution of said one shaft member.

7. A hand tool in accordance with claim 2, wherein said cutter blade includes an upper surface and a lower surface, and said cutter blade is tapered downwardly and outwardly in a direction from said upper surface toward said lower surface to define said cutting edges for separating said ice cream from said scoop member.

8. A portable hand tool for dispensing a food item, such ice cream or the like, comprising an elongated body, said body including a handle portion at one end and a hollow, open-topped scoop member adjacent the opposite end, a cutter means mounted for oscillatory movement within said scoop member, said scoop member having a generally uniform curving interior surface being defined adjacent its open top by an endless peripheral edge, said cutter means including an elongated cutter blade curved to conform to the curvature of said interior surface, said cutter blade is generally uniform in thickness throughout its length and includes opposed, laterally extending cutting edges for cutting engagement with said food item, said cutter blade is pivotally connected adjacent its opposite ends to oppositely disposed sides of said scoop member adjacent said peripheral edge, motor means mounted in said body and operably connected to said cutter blade for imparting pivotal, oscillating movement thereto, and rotation limiting means operably connected between said cutter blade and said motor means for imparting oscillatory movement of said cutter blade in one direction to position one of said cutting edges in cutting position above one portion of said peripheral edge on one side of said scoop member and limiting oscillatory movement of said cutter blade in the opposite direction to position the opposed cutting edge of said cutter blade in the cutting position above an opposed portion of said peripheral edge on the opposite side of said scoop member.

* * * * *